(12) United States Patent
Wu

(10) Patent No.: US 9,366,880 B2
(45) Date of Patent: Jun. 14, 2016

(54) REPLACEABLE ARM STRUCTURE FOR SPECTACLES

(71) Applicant: CHENG YI OPTICAL (XIAMEN) CO., LTD., Xiamen (CN)

(72) Inventor: Tang Yu Wu, Xiamen (CN)

(73) Assignee: CHENG YI OPTICAL (XIAMEN) CO., LTD., Xiamen, Fujian (CN)

( * ) Notice: Subject to any disclaimer, the term of this patent is extended or adjusted under 35 U.S.C. 154(b) by 0 days.

(21) Appl. No.: 14/430,553

(22) PCT Filed: Nov. 8, 2013

(86) PCT No.: PCT/CN2013/086771
§ 371 (c)(1),
(2) Date: Mar. 24, 2015

(87) PCT Pub. No.: WO2015/066887
PCT Pub. Date: May 14, 2015

(65) Prior Publication Data
US 2016/0004094 A1   Jan. 7, 2016

(51) Int. Cl.
*G02C 5/22* (2006.01)
*G02C 5/14* (2006.01)

(52) U.S. Cl.
CPC .............. *G02C 5/2281* (2013.01); *G02C 5/146* (2013.01); *G02C 2200/08* (2013.01)

(58) Field of Classification Search
CPC ............ G02C 5/22; G02C 3/003; G02C 5/20; G02C 9/00; G02C 5/2254; G02C 5/2263; G02C 5/2281; G02C 7/16
USPC ............. 351/116, 119, 121, 111, 153; 16/228
See application file for complete search history.

(56) References Cited

U.S. PATENT DOCUMENTS

| 7,033,021 | B1 * | 4/2006 | Wu ........................... G02C 5/10 351/111 |
| 7,237,892 | B2 * | 7/2007 | Curci ....................... G02C 5/04 16/228 |
| 7,264,349 | B1 * | 9/2007 | Ku ........................ G02C 5/2236 16/228 |
| 2009/0153792 | A1 * | 6/2009 | Lee .......................... G02C 5/20 351/119 |
| 2013/0293828 | A1 * | 11/2013 | Kuo ........................ G02C 5/20 351/121 |

* cited by examiner

*Primary Examiner* — Hung Dang
(74) *Attorney, Agent, or Firm* — Leong C. Lei

(57) ABSTRACT

A replaceable arm structure for spectacles comprises a joint unit disposed between a frame and an arm. A front end of the joint unit is pivotally connected to the frame, and a rear end of the joint unit forms a horizontal spindle perpendicularly connected to a radial locating shaft. A horizontal axial hole and an axial cutout slot communicating with a radial locating slot perpendicularly are formed on a front end of the arm. The rear end of the joint unit is pivotally connected to the arm by fitting the horizontal spindle with the horizontal axial hole. The rear end of the joint unit and the arm are fixed together by fitting the radial locating shaft with the radial locating slot.

3 Claims, 2 Drawing Sheets

REPLACEABLE ARM STRUCTURE FOR SPECTACLES

BACKGROUND OF THE INVENTION (a) Technical Field of the Invention

The present invention relates to a structure for spectacles and relates particularly to a replaceable arm structure for spectacles.

(b) Description of the Prior Art

Typically, spectacles or glasses mainly comprise a frame, arms and lenses. Generally, the frame is pivotally connected to the arms by screws. To change or replace the arms, the user has to use professional tools to unscrew the screws. Such operation is really inconvenient. Moreover, the repeated replacement of the arms causes the screws to get loosened from screw holes easily, and this loose situation affects the connection between the frame and the arms.

Accordingly, the inventor of the subject application invents a new arm structure for spectacles to facilitate the replacement.

SUMMARY OF THE INVENTION

An object of the present invention is to provide a replaceable arm structure for spectacles to assemble and renew the arm with ease.

To fulfill the aforementioned object, the technique of this invention is described as follows.

A replaceable arm structure for spectacles comprises a joint unit disposed between a frame and an arm. A front end of the joint unit is pivotally connected to the frame. A rear end of the joint unit provides a horizontal spindle and a radial locating shaft formed thereon. The horizontal spindle is connected perpendicularly to the radial locating shaft A horizontal axial hole and a radial locating slot are formed at a front end of the arm. An axial cutout slot is formed on the horizontal axial hole. The horizontal axial hole and the axial cutout slot communicate with the radial locating slot perpendicularly. The rear end of the joint unit is pivotally connected to the arm by fitting the horizontal spindle with the horizontal axial hole. The rear end of the joint unit and the arm are fixed together by fitting the radial locating shaft with the radial locating slot.

Preferably, the front end of the joint unit and the frame form respective pivot seats which are mutually matched. Respective pivotal holes are defined on the pivot seats. The front end of the joint unit is pivotally connected to the frame by inserting a connective screw into the pivotal holes.

Preferably, a diameter of the radial locating shaft is smaller than a diameter of the horizontal spindle, a width of the axial cutout slot is larger than the diameter of the radial locating shaft, and a width of the radial locating slot is smaller than the diameter of the radial locating shaft.

By adopting the aforementioned technique, the present invention has a simple structure. When the arm is adapted to assemble, the front end of the joint unit is pivotally connected to the frame, and the rear end of the joint unit is fixed to the arm by fitting the horizontal spindle with the horizontal axial hole and then fitting the radial locating shaft with the radial locating slot. Therefore, the arm is pivotally connected to the frame by using the joint unit to facilitate the assembling process.

To replace or renew the arm, the radial locating shaft can be extracted from the radial locating slot, and then the horizontal spindle can be extracted from the horizontal axial hole. Accordingly, an old arm can be detached, and a new arm can be reassembled. The process of replacing needs no professional tools, and the operation thereof is very convenient. The repeated replacement needs not to unscrew any screws. The present invention also ensures that the pivotal connection between the frame and the arm is stable.

The present invention will be described in detail upon reading the following preferred embodiment in combination with the drawings.

DETAILED DESCRIPTION OF THE PREFERRED EMBODIMENTS

Figure 1:
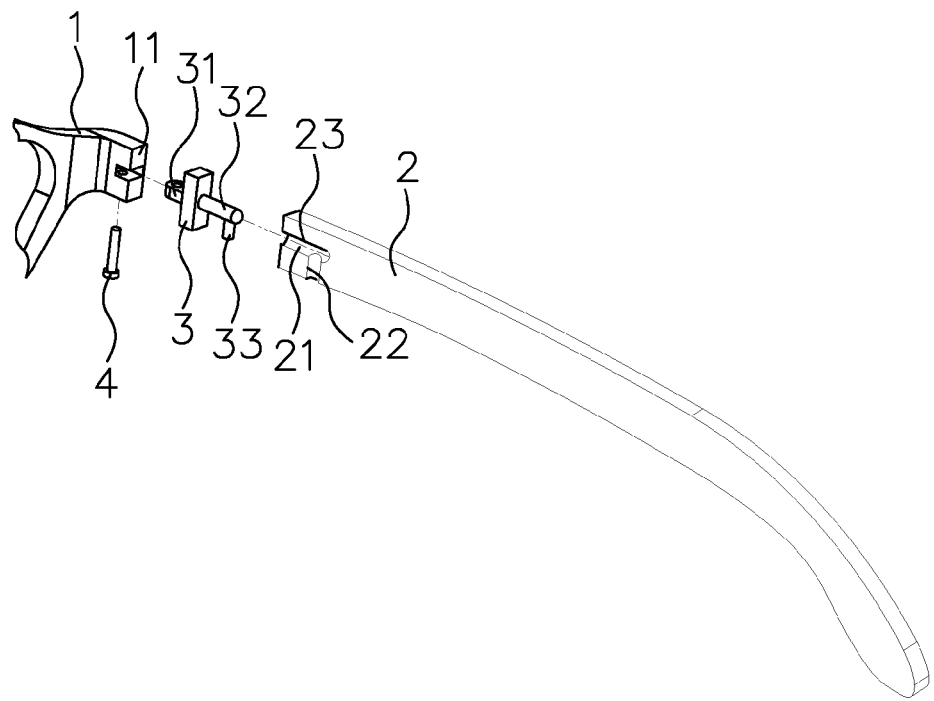
FIG. 1 is an exploded view showing a preferred embodiment of the present invention.

FIG. 1 shows a preferred embodiment of the present invention.

The present invention discloses a replaceable arm structure for spectacles which comprises a joint unit 3 disposed between a frame 1 and an arm 2.

Figure 2:
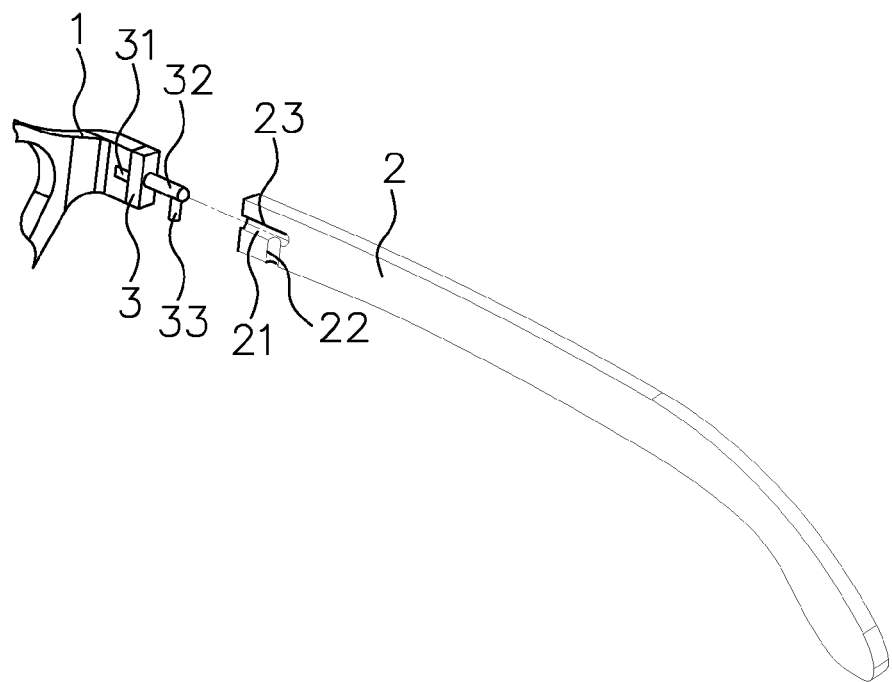
FIG. 2 is a perspective view showing the preferred embodiment of the present invention at the time of assembling.

A front end of the joint unit 3 is pivotally connected to the frame 1. To facilitate a pivotal connection of elements, two pivot seats 31, 11 complementary in shape with each other are respectively disposed on a front end of the joint unit 3 and the frame 1. The pivot seats 31, 11 define respective pivotal holes corresponding with each other. A screw 4 is inserted into the corresponding pivotal holes to allow the front end of the joint unit 3 to be pivotally connected to the frame 1, as illustrated in FIG. 2.

Figure 3:
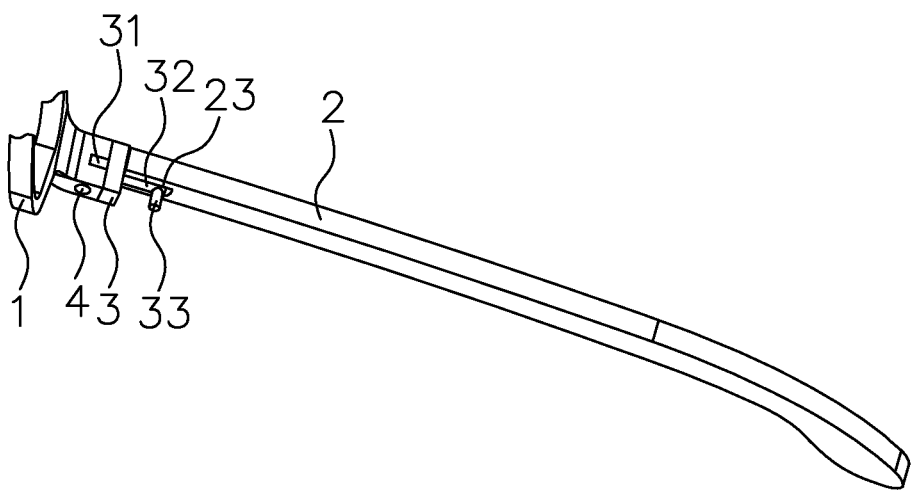
FIG. 3 is another perspective view showing the preferred embodiment of the present invention at the time of assembling.
Figure 4:
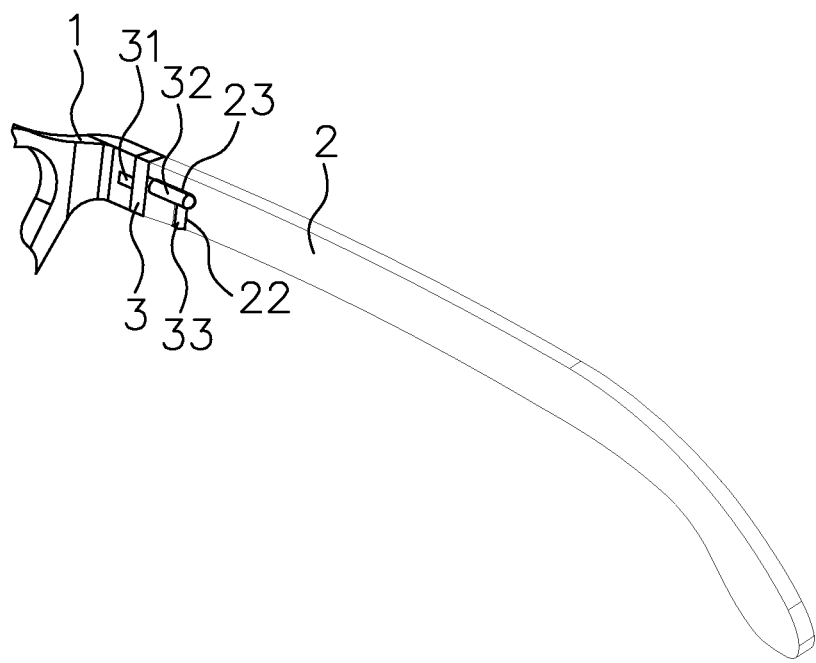
FIG. 4 is another perspective view showing the preferred embodiment of the present invention at the time of assembling.

A horizontal spindle 32 and a radial locating shaft 33 are formed at a rear end of the joint unit 3. The horizontal spindle 32 and the radial locating shaft 33 are connected vertically or perpendicularly. A horizontal axial hole 21 and a radial locating slot 22 are formed at a front end of the arm 2. An axial cutout slot 23 is formed on the horizontal axial hole 21. The horizontal axial hole 21 and the axial cutout slot 23 communicate with the radial locating slot 22 perpendicularly. Referring to FIG. 3, the arm 2 is assembled by inserting the horizontal spindle 32 into the horizontal axial hole 21 so that the rear end of the joint unit 3 can be pivotally connected to the arm 2. The radial locating shaft 33 passes the axial cutout slot 23. Then, the arm 2, as shown in FIG. 4, is rotated to lodge the radial locating shaft 33 in the radial locating slot 22. Accordingly, the rear end of the joint unit 3 is fixed to the arm 2. Therefore, the use of the joint unit 3 connects the arm 2 to the frame 1 pivotally and facilitates the assembling operation.

To assemble the structure more conveniently and firmly, it is preferably adopted in this embodiment that a diameter of the radial locating shaft 33 is smaller than a diameter of the horizontal spindle 32, and a width of the axial cutout slot 23 is larger than the diameter of the radial locating shaft 33 for allowing the radial locating shaft 33 to pass the axial cutout slot 23 conveniently. A width of the radial locating slot 22 is smaller than the diameter of the radial locating shaft 33 for allowing the radial locating shaft 33 to be firmly lodged in the radial locating slot 22 and positioned.

To replace the arm 2, as shown in FIG. 4, the arm 2 is rotated, and the radial locating shaft 33 leaves the radial locating slot 22 under the rotation. Then, the horizontal spindle 32, as shown in FIG. 3, is pulled out of the horizontal axial hole 21 to make the radial locating shaft 33 pass the axial cutout slot 23. Thus, the old arm is detached, and a new arm is reassembled. The full process of replacing does not need any professional tools. The operation of replacing is really convenient. The repeated replacement needs not to unscrew any screws. The present invention ensures that the pivotal connection between the frame 1 and the arm 2 is stable.

While the embodiment of the present invention is shown and described, it is understood that further variations and modifications may be made without departing from the scope of the invention.

I claim:

1. A replaceable arm structure for spectacles comprising a joint unit disposed between a frame and an arm, a front end of said joint unit being pivotally connected to said frame, a rear end of said joint unit forming a horizontal spindle and a radial locating shaft, said horizontal spindle and said radial locating shaft being in a perpendicular connection, a horizontal axial hole and a radial locating slot being formed at a front end of said arm, an axial cutout slot being formed on said horizontal axial hole, said horizontal axial hole and said axial cutout slot communicating with said radial locating slot perpendicularly, said rear end of said joint unit being pivotally connected to said arm by fitting said horizontal spindle with said horizontal axial hole, said rear end of said joint unit being fixed to said arm by fitting said radial locating shaft with said radial locating slot.

2. The replaceable arm structure for spectacles as claimed in claim 1, wherein said front end of said joint unit and said frame forms respective pivot seats which are mutually matched, respective pivotal holes being defined on said pivot seats, said front end of said joint unit being pivotally connected to said frame by inserting a connective screw into said pivotal holes.

3. The replaceable arm structure for spectacles as claimed in claim 1, wherein a diameter of said radial locating shaft is smaller than a diameter of said horizontal spindle, a width of said axial cutout slot being larger than said diameter of said radial locating shaft, a width of said radial locating slot being smaller than said diameter of said radial locating shaft.

* * * * *